3,119,789
PROCESS FOR PREPARING HIGH MOLECULAR WEIGHT FORMALDEHYDE POLYMERS
Johannes J. M. Evers, Sittard, Netherlands, assignor to Stamicarbon N.V., Heerlen, Netherlands
No Drawing. Filed July 25, 1960, Ser. No. 44,867
Claims priority, application Netherlands July 29, 1959
6 Claims. (Cl. 260—67)

The present invention relates to a process for preparing high-molecular weight polymers from formaldehyde, the polymerization being carried out in such a way that the average molecular weight of the resulting products can be controlled within certain limits. As will be appreciated, control of the average molecular weight during the polymerization is desirable to prevent the formation of polymers with such a high molecular weight that they cannot be further processed.

It is indicated in British Patent 796,862 that the average molecular weight can be controlled by adding a definite amount of one or more so-called "chain transfer agents" during the polymerization of the very pure, water-free monomer. Substances which may be used as such chain transfer agents are water, methanol and formic acid. Additionally, British Patent 796,863 mentions a large number of organic compounds which may be used as chain transfer agents in the preparation of formaldehyde polymers. Among the agents disclosed in British Patent 796,863 are esters containing at least three carbon atoms. This suggests that, of the formic acid esters, only the ethyl ester or higher esters would be suitable.

Surprisingly, it has now been found that methyl formate is an effective chain transfer agent for use in the polymerization of formaldehyde. This discovery could not be predicted from the prior art, e.g., the above noted British patents, and is in fact contrary to what would be expected therefrom.

The activity of methyl formate as a chain transfer agent, according to the invention, is particularly apparent if the polymerization of the formaldehyde is carried out at temperatures below the boiling point of methyl formate, preferably below 30° C. Accordingly, the polymerization can be readily effected at room temperature (20° C.). However, somewhat higher or lower temperatures, e.g., 0, 5, 10, or 25° C. may also be used.

Methyl formate may be used as a chain transfer agent in the polymerization of gaseous formaldehyde, irrespective of the manner in which the formaldehyde has been prepared. For example, the formaldehyde used herein may be prepared by thermal decomposition of paraformaldehyde, α-polyoxymethylene, or a hemiformal, such as cyclohexyl hemiformal.

According to the invention, the polymerization of formaldehyde in which methyl formate is used as a chain transfer agent may be carried out in any desirable reaction medium, e.g., in saturated aliphatic or aromatic hydrocarbons, such as hexane, heptane, octane, cyclohexane, methylcyclohexane, decahydronaphthalene, benzene, toluene and xylene, or in other inert liquids. Additionally, any of the known formaldehyde polymerization initiators, such as alkyl amines, alkyl phosphines or alkyl arsines, quaternary ammonium salts, and organometallic compounds may be used. This includes such specific materials as: triphenyl phosphine, triethylphosphine, tributylamine, cyclohexylamine, toluidine, trinaphthylarsine, dimethyl-di(hydrogenated tallow) ammonium acetate, aluminum isopropoxide. The polymerization is preferably carried out at atmospheric pressure. However, higher pressures, e.g., 2, 3, 5 or 10 atm. may also be used if desired.

The invention is illustrated, but not limited by the following example:

*Example*

Gaseous formaldehyde, obtained by thermal decomposition of cyclohexyl hemiformal, was introduced via a low temperature zone (−10 to −20° C.), into a reactor containing 1.5 litres of heptane with 0.33 millimole of triphenyl phosphine, per litre of distributing agent, as polymerization initiator. The rate of introduction during the polymerization was always so controlled that formaldehyde just barely did not escape from the reactor. The temperature of the reactor contents was kept at 5–10° C.

In comparative tests different amounts of methyl formate were added to the distributing agent during the polymerization. In addition, a blank was run in which no chain transfer agent was added. The inherent viscosity of the resulting high-molecular weight formaldehyde polymers was determined on a 0.5% solution in p-chlorophenol at 60° C. The results of the tests are shown in the following table.

| Amount of methyl formate in millimoles per litre of heptane: | Inherent viscosity of the polymer |
|---|---|
| 0 | 29.3 |
| 0.33 | 22.2 |
| 0.66 | 18.8 |
| 2.66 | 5.7 |

These results clearly show that as the methyl formate content of the distributing agent or reaction medium is increased, the inherent viscosity of the polymer, and consequently the weight average molecular weight calculated from it, decreases regularly. Optimum results are obtained using from 2.5 to 3.5 millimoles of the methyl formate per litre of heptane or other reaction medium. Stated another way, the amount of methyl formate may preferably comprise from 0.08 to 0.12 millimole per litre (at atmospheric pressure) of formaldehyde subjected to polymerization.

Usually this will give a product having an inherent viscosity measured as above indicated within the range of 3 to 7. This conforms generally with a molecular weight range of between about 75,000 and 200,000.

Having described the invention, what is claimed as new is:

1. In a process for preparing high molecular weight formaldehyde polymers having a controlled average molecular weight by polymerizing formaldehyde in the presence of a chain-transfer agent, the improvement which comprises polymerizing said formaldehyde in the presence of methyl formate added to said formaldehyde in an amount varying from 0.08 to 0.12 millimole per liter based on gaseous formaldehyde measured at atmospheric pressure to serve as a chain transfer agent.

2. The process of claim 1 wherein the polymerization is carried out at a temperature below the boiling point of methyl formate.

3. The process of claim 2 wherein the polymerization is carried out at 0–25° C.

4. The process of claim 1 wherein the polymerization is carried out at atmospheric pressure.

5. The process of claim 1 wherein the polymerization is carried out by passing gaseous formaldehyde into an inert reaction medium containing said methyl formate.

6. The process of claim 5 wherein said inert reaction medium is selected from the group consisting of saturated aliphatic and aromatic hydrocarbons.

References Cited in the file of this patent
FOREIGN PATENTS

| 796,862 | Great Britain | June 18, 1958 |
| 796,863 | Great Britain | June 18, 1958 |
| 527,227 | Canada | July 3, 1956 |